United States Patent [19]

Tomlinson et al.

[11] Patent Number: 4,543,892

[45] Date of Patent: Oct. 1, 1985

[54] CONDENSATE HANDLING MEANS FOR CONDENSING FURNACE

[75] Inventors: Ronald S. Tomlinson, Nashville; Bryan O. Trent, Smyra, both of Tenn.

[73] Assignee: Heil-Quaker Corporation, Lewisburg, Tenn.

[21] Appl. No.: 553,744

[22] Filed: Nov. 17, 1983

[51] Int. Cl.[4] .................... F23J 15/00; F01M 3/15; F17D 1/00; B01D 35/00

[52] U.S. Cl. .................... 110/203; 422/178; 137/558; 137/561 A; 210/433.1; 210/434; 210/436; 210/86

[58] Field of Search .................. 110/203, 216, 345; 126/307 R; 422/178, 168, 177, 112, 115, 119; 210/86, 121, 418, 433.1, 434, 436, 472, 539; 137/558, 561 A, 590.5; 237/55

[56] References Cited

U.S. PATENT DOCUMENTS

| | | | |
|---|---|---|---|
| 1,956,132 | 4/1934 | Philabert | 210/433.1 |
| 3,944,136 | 3/1976 | Huie | 237/55 |
| 3,950,137 | 4/1976 | Larson | 422/115 |
| 4,164,210 | 8/1979 | Hollowell | 126/110 R |
| 4,227,647 | 10/1980 | Eriksson | 237/55 |
| 4,261,326 | 4/1981 | Ihlenfield | 126/110 R |
| 4,289,730 | 9/1981 | Tomlinson | 422/178 |
| 4,309,947 | 1/1982 | Ketterer | 110/203 |
| 4,318,392 | 3/1982 | Schreiber et al. | 126/110 R |
| 4,387,020 | 6/1983 | Hill | 210/86 |

FOREIGN PATENT DOCUMENTS 924155  7/1947  France .................. 137/558

Primary Examiner—William E. Lyddane
Assistant Examiner—Gerald Anderson
Attorney, Agent, or Firm—Wood, Dalton, Phillips, Mason & Rowe

[57] ABSTRACT

An improved condensate neutralizer for use in a high efficiency furnace utilizing hydrocarbon gaseous fuel wherein acidic liquid condensate forms. The neutralizer is provided with a bypass for conducting the condensate from the furnace directly to a drain without passing through the neutralizer in the event condensate flow through the neutralizer becomes substantially impeded. Also disclosed is structure for indicating substantial impediment of flow of the condensate through the neutralizer for alerting the user to the need of servicing of the neutralizer. A separator/trap is provided for transferring the condensate from the furnace selectively to the neutralizer or bypass.

12 Claims, 3 Drawing Figures

CONDENSATE HANDLING MEANS FOR CONDENSING FURNACE

BACKGROUND OF THE INVENTION

1. Field of the Invention

This invention relates to high efficiency gas-fired furnaces, and in particular to means for handling condensate formed in the products of combustion therein.

2. Description of the Background Art

Modern furnaces frequently employ a secondary heat exchanger to extract additional heat from the products of combustion and thereby improve the overall efficiency of the furnace. A problem, however, arises in such furnaces as the increased heat extraction causes condensate to form in the products of comubstion at the relatively low discharge temperatures provided by such furnaces. The combustion of conventional hydrocarbon fuels results in the formation of various products of combustion which, when dissolved in the condensate, tend to form acid solutions. Illustratively, natural gas typically includes some sulfur dioxide and sulfur trioxide which, when dissolved in the water vapor condensate, produce weak sulfuric acid. Similarly, carbon dioxide, in the products of combustion, may form a weak carbonic acid.

Notwithstanding the weak characteristics of the acid, it is, in some instances, undesirable to discharge such acidic condensate directly to conventional household drains and the like. One solution to the problem has been to provide means for neutralizing the acidic condensate before discharging it to the drain. An example of such a furnace structure is illustrated in U.S. Pat. No. 4,289,730 of Ronald S. Tomlinson, which patent is owned by the assignee hereof. As shown therein, a neutralizer is mounted within the furnace cabinet for treatment of the acidic condensate and neutralization thereof prior to the delivery thereof from the furnace, such as to the household drain.

A similar structure is illustrated in U.S. Pat. No. 4,309,947 of Edward A. Ketterer, which patent is also owned by the assignee hereof. In this patent, agitation of the neutralizer is effected during operation thereof so as to provide improved neutralizing action.

SUMMARY OF THE INVENTION

The present invention is concerned with the provision of an improved neutralizing means for use in association with a high efficiency furnace which generates acidic condensate as an incident of its operation.

The invention comprehends the provision of means associated with the neutralizing means for automatically bypassing the neutralizing means in the event condensate flow through the neutralizing means becomes substantially impeded.

The invention further comprehends the provision of means associated with the neutralizing means and bypassing means for indicating to the user the flow-impeded condition, permitting minimizing of the delivery of unneutralized condensate to the discharge position, or drain.

In the illustrated embodiment, the improved condensate neutralizing means includes a separator/trap, first conveying means for conveying condensate from the separator/trap to the neutralizer means, second conveying means for conveying neutralized condensate to the drain, and bypass means for conducting the condensate directly to the drain without passing through the neutralizer means in the event that flow through the neutralizer means becomes substantially impeded.

In the illustrated embodiment, the bypassing means and neutralizing means are arranged to deliver the condensate to the same discharge position, which, in the illustrated embodiment, comprises a common drain.

In the illustrated embodiment, the indicating means comprises means for providing a visual indication of the impeded condition.

The improved condensate neutralizing means of the present invention is extremely simple and economical of construction while yet providing the highly desirable features discussed above.

BRIEF DESCRIPTION OF THE DRAWINGS

Other features and advantages of the invention will be apparent from the following description taken in connection with the accompanying drawings wherein.

DESCRIPTION OF THE PREFERRED EMBODIMENT

Figure 1:
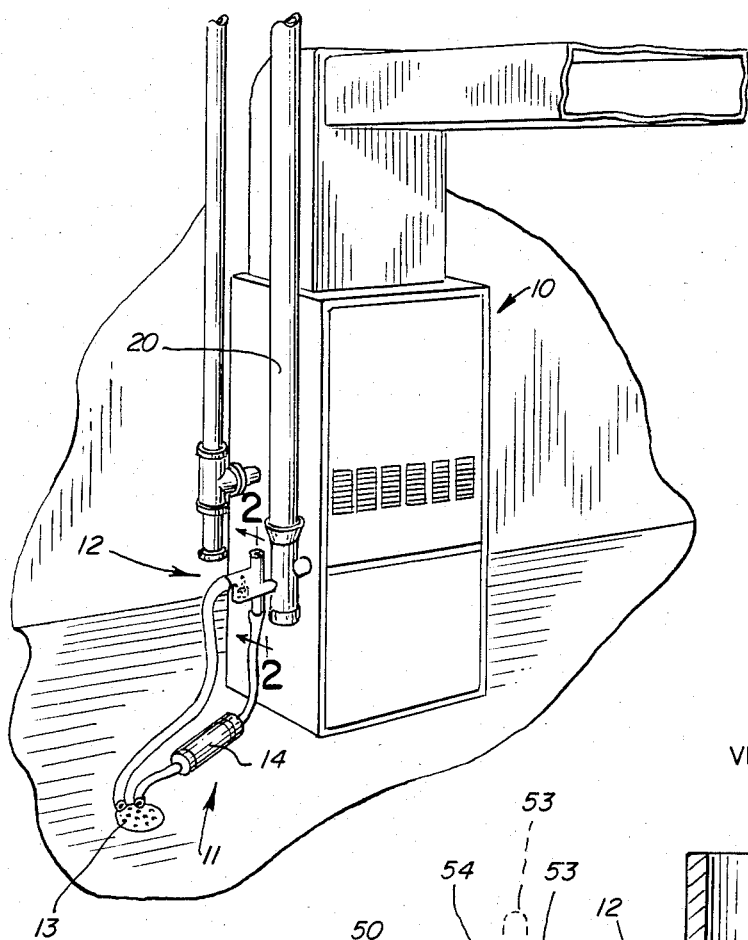
FIG. 1 is a fragmentary perspective view of a furnace having improved condensate neutralizing means embodying the invention.

In the illustrative embodiment of the invention as disclosed in the drawings, a high efficiency, condensing furnace generally designated 10 is provided with condensate neutralizing means generally designated 11 embodying the invention. By way of example, the invention may be used in association with a domestic forced air furnace of the type disclosed in applicants' copending application Ser. No. 529,471, entitled "High Efficiency Furnace With Secondary Heat Exchanger," and owned by the assignee hereof. The neutralizing means includes bypassing means generally designated 12 for conducting condensate from the furnace directly to a discharge position, such as drain 13, without passing through the neutralizing device 14 in the event the condensate flow through the neutralizing material 15 in neutralizing device 14 becomes substantially impeded.

The invention further comprehends the provision of means associated with the bypassing means 12 of means generally designated 16 for indicating substantial impeding of flow through the neutralizing device.

As is known to those skilled in the art, an increase in the efficiency of a hydrocarbon gaseous fuel furnace to above approximately 85 percent annular fuel utilization efficiency causes a problem in the handling of the condensate formed in the gaseous combustion products in the furnace. Conventional natural gas used as a common fuel in domestic furnaces frequently contains sulfur which, as a result of the combustion, produces sulfur dioxide or sulfur trioxide. The normal combustion products of such high carbon fuels are carbon dioxide and water vapor. The sulfur oxide materials form weak sulfuric acid solutions when dissolved in the condensate resulting from the low temperature of the discharged products of combustion. As disclosed in the above-identified U.S. Pat. No. 4,289,730, it is known to use a neutralizer containing neutralizing material in a suitable housing through which the acidic condensate is flowed so as to treat the acidic condensate suitably to neutralize it before delivering it to the drain.

It is important that the condensate be permitted to drain freely from the furnace, as any backup in the condensate will cause collection of the weak acidic components within the furnace, tending to cause corrosion and possibly causing undesirable operational effects of the furnace. It has been found that the flow of the condensate through the neutralizing material tends to become progressively impeded as a result of the neutralizing chemical action and the buildup of particulate matter within the neutralizer therein, such that, in a conventional neutralizer, sufficient impediment to flow may occur so as to cause backup of the acidic condensate with the attendant problems discussed above.

Bypassing means 12 is provided for effectively preventing such backup of the acidic condensate and, thus, offers a novel and simple solution to this problem. Indicating means 16 provides an indication to the user of the flow-impeded condition, permitting the user to take suitable steps to remedy the condition with minimal delivery of the acidic condensate directly to the drain.

Figure 3:
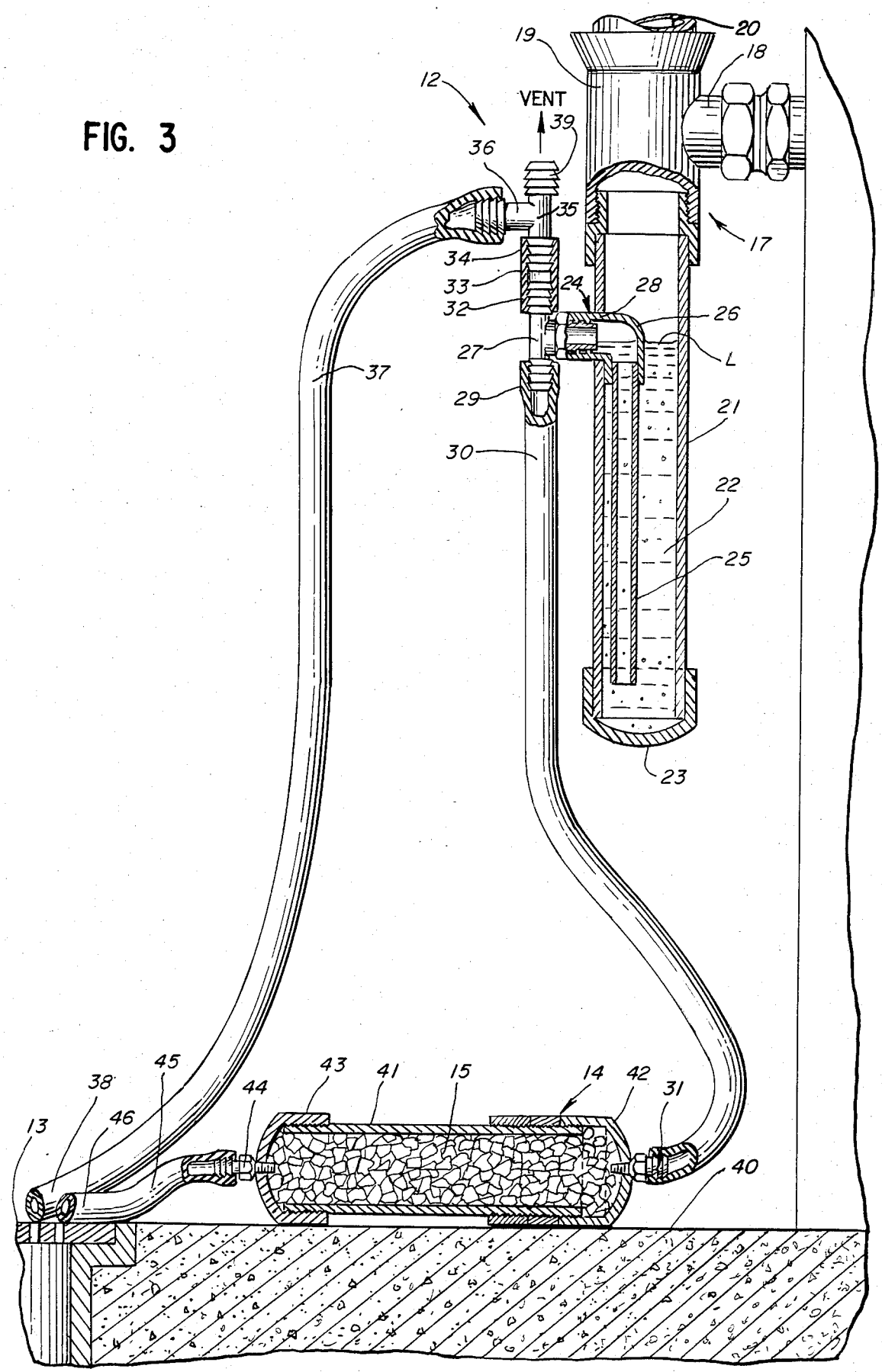
FIG. 3 is a fragmentary elevation partially in section illustrating the condensate neutralizing means in greater detail.

Referring to FIG. 3, the neutralizing means 11 is shown to include a separator/trap generally designated 17 having an inlet connection 18 for receiving the combustion products discharged from the furnace. An upper portion 19 of the separator/trap 18 connects to a vent pipe 20 for the gaseous products of combustion.

The lower portion 21 of apparatus 17 defines a trap in which the condensate 22 received from the furnace is collected. As shown, the lower end of the trap portion is closed by a suitable cap 23. An outlet tube 24 includes a depending tubular leg 25 extending downwardly through portion 21 to adjacent cap 23, and an elbow 26 opening outwardly through the trap wall.

In the embodiment of FIG. 3, a first T-connector 27 has its stem portion 28 threadedly connected to the elbow 26. One arm 29 of the T-connector is connected through a flexible tube 30 to an inlet connection 31 of the neutralizing device 14. The opposite arm 32 of the T-connector is connected through a tubular coupling 33 to one arm 34 of a second T-connector 35. The stem 36 of T-connector 35 is connected to a discharge tube 37 having its distal end 38 disposed adjacent drain 13, as seen in FIG. 3.

The other arm 39 of the T-connector 35 extends upwardly and defines a vent outlet, which acts to prevent the condensate from being siphoned out of the separator/trap 17.

As shown in FIG. 3, the neutralizing device 14 may rest on the floor surface 40 adjacent drain 13. The neutralizing device includes a tubular body 41, an inlet end cap 42 threadedly connected to one end of body 41 and carrying the inlet 31, an outlet end cap 43 threadedly connected to the opposite end of body 41 and carrying an outlet fitting 44 to which is connected a discharge tube 45 having its distal end 46 opening adjacent drain 13. By virtue of the threaded connections of the end cap to the body 41, the neutralizing material 15 in body 41 may be readily serviced or replaced, as desired.

During operation of the furnace 10, condensate is delivered through the inlet connector 18 into separator/trap 17, and collects in the lower end of the trap as a body of condensate 22. The level of the condensate body 22 is determined by the location of the elbow 26 so that flow of collected condensate upwardly through leg 25 to the T-connector 27 causes the level L to be maintained during normal use of the apparatus. Once this level of condensate has built up, condensate is transferred from the separator/trap apparatus to the delivery tube 30 at the same rate as additional condensate is received from the furnace, and flows at this rate into the neutralizing device 14 through the inlet 31. The construction of the separator/trap 17 and the resultant build up of a body of condensate 22 therein act to prevent the undesirable discharge of gaseous combustion products from the condensate handling system into the space adjacent the furnace 10.

After flowing through the neutralizing material 15, the neutralized condensate is discharged through the outlet fitting 44 and duct 45 to the drain 13. Thus, the normal flow of the condensate is by gravity from the separator/trap through the neutralizing device 14, resting on the floor surface 40, to the drain 13. In the event flow through the neutralizing material is sufficiently impeded so as to cause the condensate in tube 30 to backup to the separator/trap 17, the upper surface level L of the condensate within the separator/trap will rise to the level of the stem 36 of T-connector 35, thereby allowing the condensate to flow downwardly through conduit 37 to drain 13, bypassing the neutralizing device 14 and effectively preventing backup of the acidic condensate 22 into the furnace through the connector 18.

Figure 2:
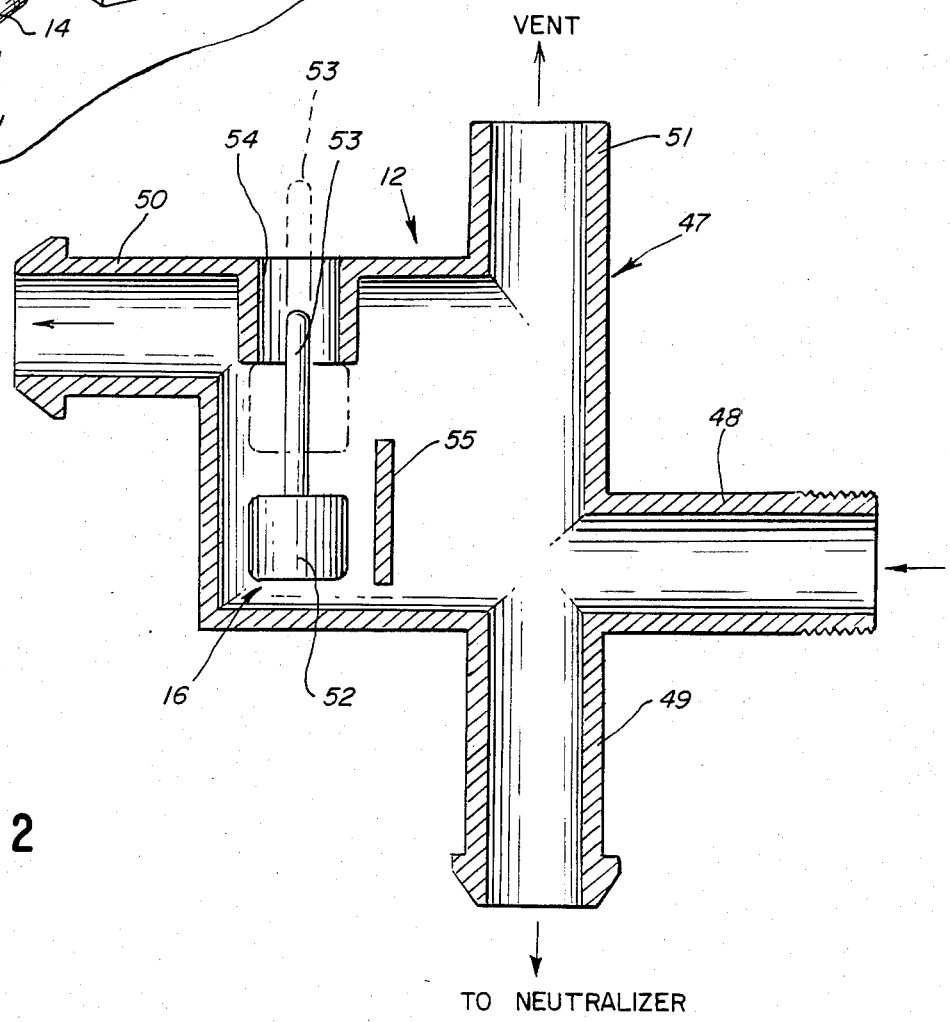
FIG. 2 is an enlarged vertical section of a connector portion of the condensate neutralizing means.

Referring to the embodiment of FIG. 2, a one-piece distribution connector generally designated 47 may be utilized in lieu of the assembled T-connectors 27 and 35 and coupling 33. As shown, the connector 47 includes an inlet portion 48 adapted to be connected to the elbow 26, a first outlet 49 adapted to be connected to the neutralizing device delivery conduit 30, a second outlet 50 adapted to be connected to the bypass conduit 37, and upwardly opening vent outlet 51.

As further shown in FIG. 2, indicating means 16 may be provided integrally with the connector 47. Thus, as shown, the indicator means illustratively may include a float 52 provided with an indicator rod 53 projecting upwardly through an upper opening 54. In the event condensate backs up in the connector to the point where it flows outwardly through the outlet 50 to the bypass conduit 37, float 52 raises the indicator rod to the broken line position shown in FIG. 2, thereby providing a visual indication to the user of the flow-impeded condition of the neutralizing device 14.

As shown in FIG. 2, connector 47 is provided with suitable wall means 55 for guiding the float 52 in effecting such indication.

While the indicator 16 is shown in FIG. 2 as being integral with the connector 47, as will be obvious to those skilled in the art, the indicator may be provided as a separate element within the scope of the invention.

Further, while the indicating means 16 is shown as comprising a visual indicator, as will be obvious to those skilled in the art, any suitable form of indicating means may be utilized, including electrically energized sound producing means, remote transmitting means, etc.

In the illustrated embodiment, the neutralizing material comprises calcium carbonate, it being understood that any suitable neutralizing agent may be utilized within the scope of the invention.

In the illustrated embodiment, the neutralizing device is disposed exteriorly of the furnace 10 so that it may be more readily serviced without requiring disassembly of the furnace. Further, by providing the exterior arrangement of the neutralizing means, leakage of any portion thereof may be readily observed by the user, and any problems associated with the condensate handling system do not affect the furnace or its operation.

As will be appreciated by those skilled in the art, the condensate handling means of the present invention is preferably used in association with a condensing furnace in which all the condensate and the combustion products are discharged from the furnace via a single outlet, as opposed to a furnace construction in which the condensate is separated and discharged from the furnace upstream of the point at which the combustion products are discharged. The present invention may, nevertheless, be used in association with the condensate outlet of a furnace having separate condensate and combustion products outlets. Alternatively, the present invention may be located internally of a furnace having a single discharge outlet for the condensate and products of combustion, although some of the foregoing advantages of external location may not be obtained.

It will also be appreciated by those skilled in the art that either the distribution connector illustrated in FIG. 2 or the T-connector arrangement shown in FIG. 3 can, if desired, be combined with the separator/trap structure 17 to form a single, integral assembly.

It is not necessary, to obtain the advantages of the present invention, that the neutralizing device be completely stopped against flow therethrough, because the bypass means will be operative whenever the buildup in the condensate is greater than the rate of flow through the neutralizing means.

The bypass means of the present invention thus provides a positive prevention of backup of the acidic condensate into the furnace, thereby preventing the undesirable corrosion and servicing problems of the prior art constructions. The bypass means is extremely simple and economical of construction while yet providing the positive backup prevention feature discussed above.

The foregoing disclosure of specific embodiments is illustrative of the broad inventive concepts comprehended by the invention.

Having described the invention, the embodiments of the invention in which an exclusive property or privilege is claimed are defined as follows:

1. In a gas-fired furnace having an outlet for discharging products of combustion condensate from the furnace, the improvement comprising:
   neutralizing means;
   a first conduit conducting condensate from said outlet to the neutralizing means;
   a second conduit for conducting neutralized condensate from said neutralizing means to a drainage access spaced therefrom, said first conduit, neutralizing means, and second conduit defining a first condensate flow path; and
   a third conduit for delivering condensate from said outlet to a drain position spaced from said neutralizing means in a second flow path fully independently of said first condensate flow path and only in the event condensate flow through said first flow path is limited by obstruction in any portion thereof to below a preselected rate of flow.

2. The furnace structure of claim 1 wherein said means for conveying the liquid condensate to said receptacle includes a condensate trap.

3. The furnace structure of claim 1 wherein said means for conveying the liquid condensate to said receptacle includes a vent means.

4. The furnace structure of claim 1 including connector means for delivering the condensate from the outlet selectively to said first and second flow path.

5. The furnace structure of claim 1 including connector means for delivering the condensate from the outlet selectively to said first and second flow path, and vent means for preventing the siphoning of condensate from said outlet.

6. The furnace structure of claim 1 including T-connector means for delivering the condensate from the outlet selectively to said first and second flow path, and vent means for venting said T-connector means at outlet.

7. The furnace structure of claim 1 wherein said connector means defines means for retaining a body of liquid condensate at the outlet and further includes an outlet tube having an inlet end which extends downward into said body of condensate and an outlet end which is coupled to said first and second flow paths.

8. In a gas-fired furnace having an outlet for discharging products of combustion from the furnace, the improvement comprising:
   neutralizing means;
   a first conduit conducting condensate from said outlet to the neutralizing means;
   a second conduit for conducting neutralized condensate from said neutralizing means to a drainage access spaced therefrom, said first conduit, neutralizing means, and second conduit defining a first condensate flow path;
   a third conduit for delivering condensate from said outlet to a drainage access spaced from said neutralizing means in a second flow path fully independently of said first condensate flow path and only in the event condensate flow through said first flow path is limited by obstruction in any portion thereof to below a preselected rate of flow; and
   means for indicating a limitation of said condensate through said first flow path to below said preselected rate of flow.

9. The furnace structure of claim 8 wherein said indicating means comprises float-operated means.

10. The furnace structure of claim 8 wherein said indicating means comprises visual indicating means.

11. The condensate neutralization apparatus of claim 8 wherein the signal providing means comprises means responsive to delivery of the condensate through the second floor path.

12. In a high efficiency gas-fired furnace having a common outlet for discharging gaseous products of combustion and liquid condensate, improved condensate handling means comprising:
   a condensate separator/trap assembly connected to said furnace outlet and defining a flue outlet for discharging the gaseous products of combustion and a condensate outlet for discharging condensate, said separator/trap assembly having means for separating liquid condensate from the gaseous products of combustion and a condensate trap for preventing the discharge of gaseous products of combustion through said condensate outlet;
   a neutralizer receptacle for retaining a neutralizing material, said receptacle being disposed at a level below the level of said condensate separator/trap assembly and defining an inlet, an outlet, and a condensate flow path through said neutralizing material;

a condensate distribution device coupled to the condensate outlet of said separator/trap assembly, said device having a first condensate outlet, a second condensate outlet at a level above said first condensate outlet, and an atmospheric vent at a level above said second condensate outlet;

a first conduit coupling said neutralizer receptacle inlet with said distribution device first condensate outlet;

a second conduit coupled to said distribution device second outlet and arranged to convey received condensate to a discharge position; and, means for conveying condensate from said neutralizer receptacle outlet to said discharge position.

* * * * *

UNITED STATES PATENT AND TRADEMARK OFFICE
CERTIFICATE OF CORRECTION

PATENT NO. : 4,543,892

DATED : October 1, 1985

INVENTOR(S) : Ronald S. Tomlinson et al.

It is certified that error appears in the above-identified patent and that said Letters Patent is hereby corrected as shown below:

Claim 1, line 13 (col. 5, line 57) "drain position" should read --drainage access--;

Claim 2, lines 2 and 3 (col. 5, lines 64 and 65) delete "means for conveying the liquid condensate to said receptacle" and insert --outlet-- in lieu thereof;

Claim 3, lines 2 and 3 (col. 5, lines 67 and 68) delete "means for conveying the liquid condensate to said receptacle" and insert --outlet-- in lieu thereof;

Claim 11, line 4 (col. 6, line 49) "floor" should read --flow--.

Claim 12, line 30 (col. 8, line 4) after "second" insert --condensate--.

Signed and Sealed this

Sixth Day of January, 1987

Attest:

DONALD J. QUIGG

Attesting Officer

Commissioner of Patents and Trademarks